(12) United States Patent
Petts et al.

(10) Patent No.: US 7,913,601 B2
(45) Date of Patent: Mar. 29, 2011

(54) ENHANCED PERFORMANCE SAW BLADE TOOTHFORM PATTERN

(75) Inventors: Dale G. Petts, Peterborough, NH (US); Peter B. Hopper, Lunenburg, MA (US)

(73) Assignee: Simonds International Corporation, Fitchburg, MA (US)

( * ) Notice: Subject to any disclaimer, the term of this patent is extended or adjusted under 35 U.S.C. 154(b) by 30 days.

(21) Appl. No.: 11/633,752

(22) Filed: Dec. 5, 2006

(65) Prior Publication Data

US 2007/0251372 A1 Nov. 1, 2007

Related U.S. Application Data

(60) Provisional application No. 60/796,040, filed on Apr. 28, 2006.

(51) Int. Cl.
*B27B 33/06* (2006.01)
(52) U.S. Cl. .............................. 83/846; 83/661; 83/850
(58) Field of Classification Search .................... 83/661, 83/835–855
See application file for complete search history.

(56) References Cited

U.S. PATENT DOCUMENTS

| | | | |
|---|---|---|---|
| 2,568,870 A | | 9/1951 | Ronan |
| 4,179,967 A | | 12/1979 | Clark |
| 4,311,075 A | * | 1/1982 | Sundstrom ...................... 83/848 |
| 4,958,546 A | * | 9/1990 | Yoshida et al. ................. 83/848 |
| 5,018,421 A | * | 5/1991 | Lucki et al. .................... 83/835 |
| 5,477,763 A | * | 12/1995 | Kullman ........................ 83/846 |
| 6,003,422 A | * | 12/1999 | Holston ......................... 83/661 |
| D438,549 S | | 3/2001 | Tsujimoto |
| 6,220,140 B1 | * | 4/2001 | Hellebergh .................... 83/851 |
| 6,276,248 B1 | * | 8/2001 | Cranna ........................... 83/848 |
| 6,601,495 B2 | * | 8/2003 | Cranna ........................... 83/848 |
| 6,834,573 B1 | * | 12/2004 | Nakahara ....................... 83/851 |
| 7,036,415 B2 | * | 5/2006 | Tsujimoto ...................... 83/661 |
| 2002/0029679 A1 | | 3/2002 | Cranna |

(Continued)

FOREIGN PATENT DOCUMENTS

EP 1 354 655 A 10/2003
JP 2000-141126 A 5/2000

OTHER PUBLICATIONS

Extended European Search Report, European Patent Office, Application No. 07107181.5, Simonds International Corporation, Search Dated: Dec. 27, 2007.

(Continued)

*Primary Examiner* — Edward Landrum
(74) *Attorney, Agent, or Firm* — BainwoodHuang (57) ABSTRACT

A saw blade, such as a bandsaw blade, has a toothform pattern that includes a raker tooth and set teeth. The bandsaw blade teeth are configured such that a distance from a tooth point of the raker tooth to a tooth point of an immediately preceding set tooth is the smallest tooth spacing in the saw blade toothform pattern. With the use of a smaller spacing, the raker tooth removes the smallest chip thickness from a work piece relative to the chip thicknesses removed by the set teeth. This reduces the amount of load imposed on the raker tooth point. In one arrangement, in order to balance the forces on either side of the blade during operation, the saw blade is configured such that an accumulated pitch of the tooth points set to a first side of the blade are substantially equal to the accumulated pitch of the tooth points set to a second opposing side of the blade.

12 Claims, 9 Drawing Sheets

U.S. PATENT DOCUMENTS

2002/0148340 A1* 10/2002 Tsujimoto ................ 83/661
2003/0000362 A1 1/2003 Bishop
2004/0255749 A1* 12/2004 Hayden, Sr. .............. 83/788
2006/0065098 A1 3/2006 Cranna

OTHER PUBLICATIONS

Partial European Search Report, issued by European Patent Office on Aug. 3, 2007, 4 pages.

* cited by examiner

ENHANCED PERFORMANCE SAW BLADE TOOTHFORM PATTERN

CROSS REFERENCE TO RELATED APPLICATION

This Patent Application claims priority to U.S. Provisional Application No. 60/796,040 filed on Apr. 28, 2006, entitled, "ENHANCED PERFORMANCE BANDSAW BLADE TOOTHFORM PATTERN," the contents and teachings of which are hereby incorporated by reference in their entirety.

BACKGROUND

Figure 1:
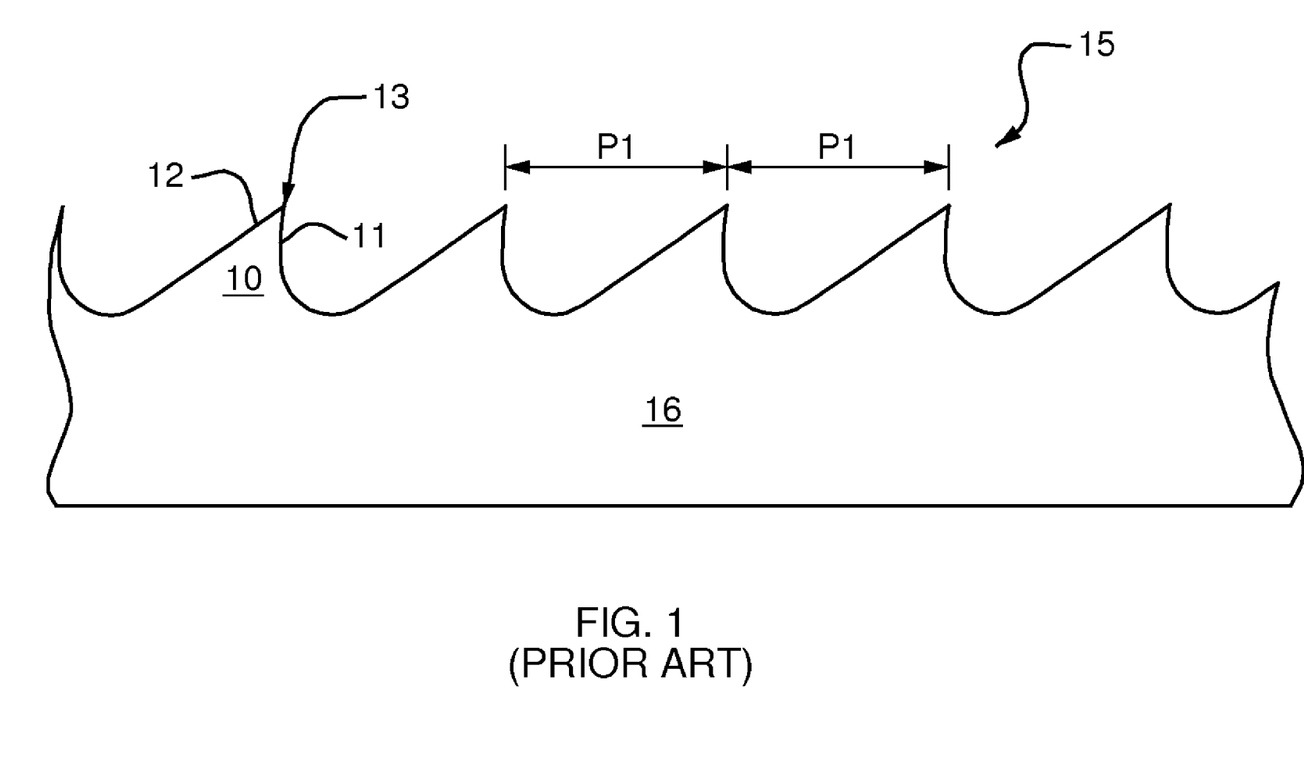
FIG. 1 is a schematic side view of a conventional bandsaw blade configuration.

It is well known to use a saw blade, such as a bandsaw blade, to cut materials to a desired size. During cutting, material is removed by a series of teeth formed into one edge of a steel strip which makes up the saw blade. FIG. 1 illustrates an example of a bandsaw blade 16 having a group 15 of teeth 10 where each a tooth 10 is defined by a face portion 11 and a back portion 12 that form a tooth point 13. The teeth 10 are spaced from each other at predetermined and substantially equal spacing intervals P1 between successive tooth points 13, often referred to as tooth pitch. The teeth 10 on this type of bandsaw blade 16 are commonly referred to as "straight pitch." In use, the teeth 10 on the edge of the blade 16 travel across a material to be cut at a predetermined speed. As a result, the blade removes a sliver of material corresponding in thickness to the rate at which the blade 16 passes through the material and the spacing between successive tooth points The teeth on a bandsaw blade can also be arranged in a recurring pattern on the blade where the teeth within the recurring pattern are disposed at different or variable spacings relative to each other (e.g., variable spacing or variable pitch among the tooth points). The tooth spacing in such a case is referred to as a variable pitch tooth spacing. For example, referring to the bandsaw blade 20 of FIG. 2, the teeth 22 are arranged in a recurring pattern on the saw blade 20 such that the pattern of teeth 22 defined along pattern length 24 of the saw blade 20 repeats along an entire length of the saw blade 20. Additionally, each tooth is disposed on the saw blade 20 at a relatively variable pitch such that each tooth spacing PL and D1 through D6 is unique within the recurring pattern of teeth (i.e., PL≠D1≠D2≠D3≠D4≠D5≠D6). Both variable pitch and straight pitch blades have advantages and disadvantages when compared to each other. For example, variable pitch blades have been shown to offer reduced vibration and noise relative to straight pitch blades. On the other hand, straight pitch blades have been shown to offer improved cutting life over variable pitch blades when noise and vibration are not present.

Figure 3:
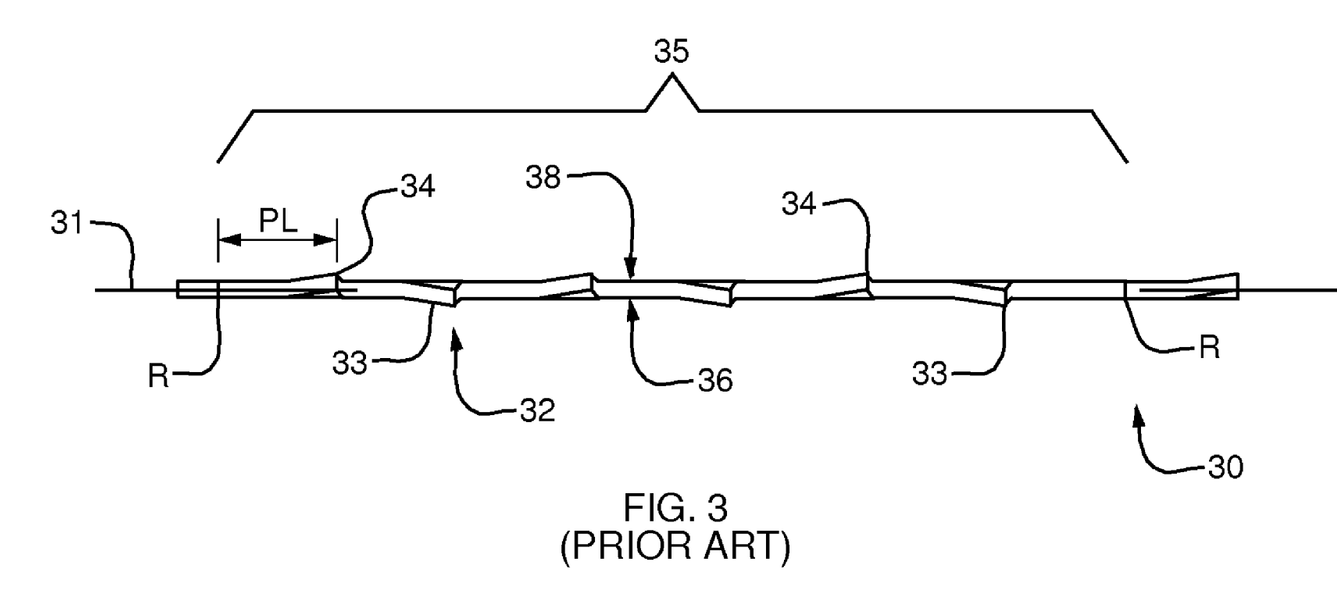
FIG. 3 is a top plan view of a conventional bandsaw blade configuration.

As illustrated in FIG. 3, in certain bandsaw blades 30, some of the teeth 32 are bent in a direction normal to a midplane 31 of the saw blade 30. The operation of bending the teeth is referred to as "setting." During setting, the bent teeth may be arranged in recurring patterns, usually beginning with a non-bent tooth R, often referred to as a raker tooth. The raker tooth R is followed by alternately bent teeth 33 and 34 such that the combination of the raker tooth R and the bent teeth 33, 34 represents one repeat of the recurring pattern 35 between raker teeth. The raker tooth R is often provided with the largest tooth spacing PL in the recurring pattern 35 to make it easier for manufacturing to identify which tooth to reference when performing the setting operation (e.g., to minimize accidental setting or bending of the raker tooth).

Figure 4A:
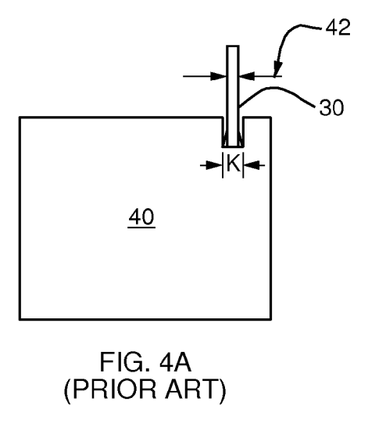
FIG. 4A is a schematic view illustrating a kerf formed by the bandsaw blade of FIG. 3.
Figure 4B:
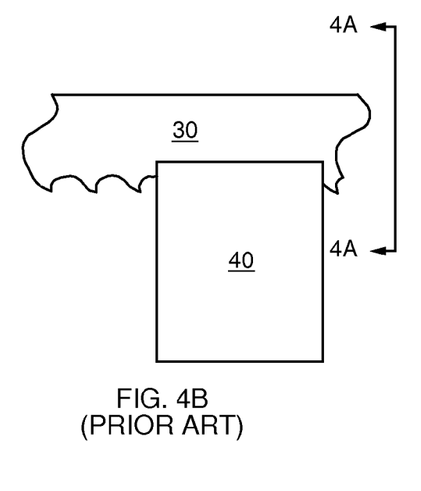
FIG. 4B is a side view of the bandsaw blade and work piece of FIG. 4A.

In many variable pitch bandsaw blade designs, the volume of material removed during cutting varies from one side of the blade to the other side. The volume of material removed is related to the accumulated pitch of the bent teeth in the pattern where some teeth are bent to one side of the blade and some are bent to the opposite side of the blade. For example, as shown in FIG. 3, adjacent bent teeth 33, 34 are set in opposing directions where a first group of set teeth 33 are bent toward the first side of the blade 36 and a second group of set teeth 34 are bent toward the second side of the blade 38, relative to the midplane 31. With reference to FIGS. 4A and 4B, when the combination of a non-bent raker tooth R and alternately bent set teeth 33, 34 pass through a work piece 40, the tooth points remove material and create a slot or kerf K for passage of the bandsaw blade 30 through the material that is wider than a thickness 42 of the blade 30.

The purpose of the raker tooth R has traditionally been to stabilize the band and prevent the uneven forces generated by the bent teeth 33, 34 from causing the blade 30 to move or cut away from an intended cut plane. In a variable pitch blade, it is common practice to make the spacing in front of the raker tooth R the largest space in the recurring variable pitch pattern. For example, in FIG. 2 the tooth spacing PL, which is directly in front of the raker tooth R, is the largest tooth spacing in the pattern along pattern length 24. By creating the spacing in this manner, the raker tooth R removes more material during cutting than the bent or set teeth.

Figure 2:
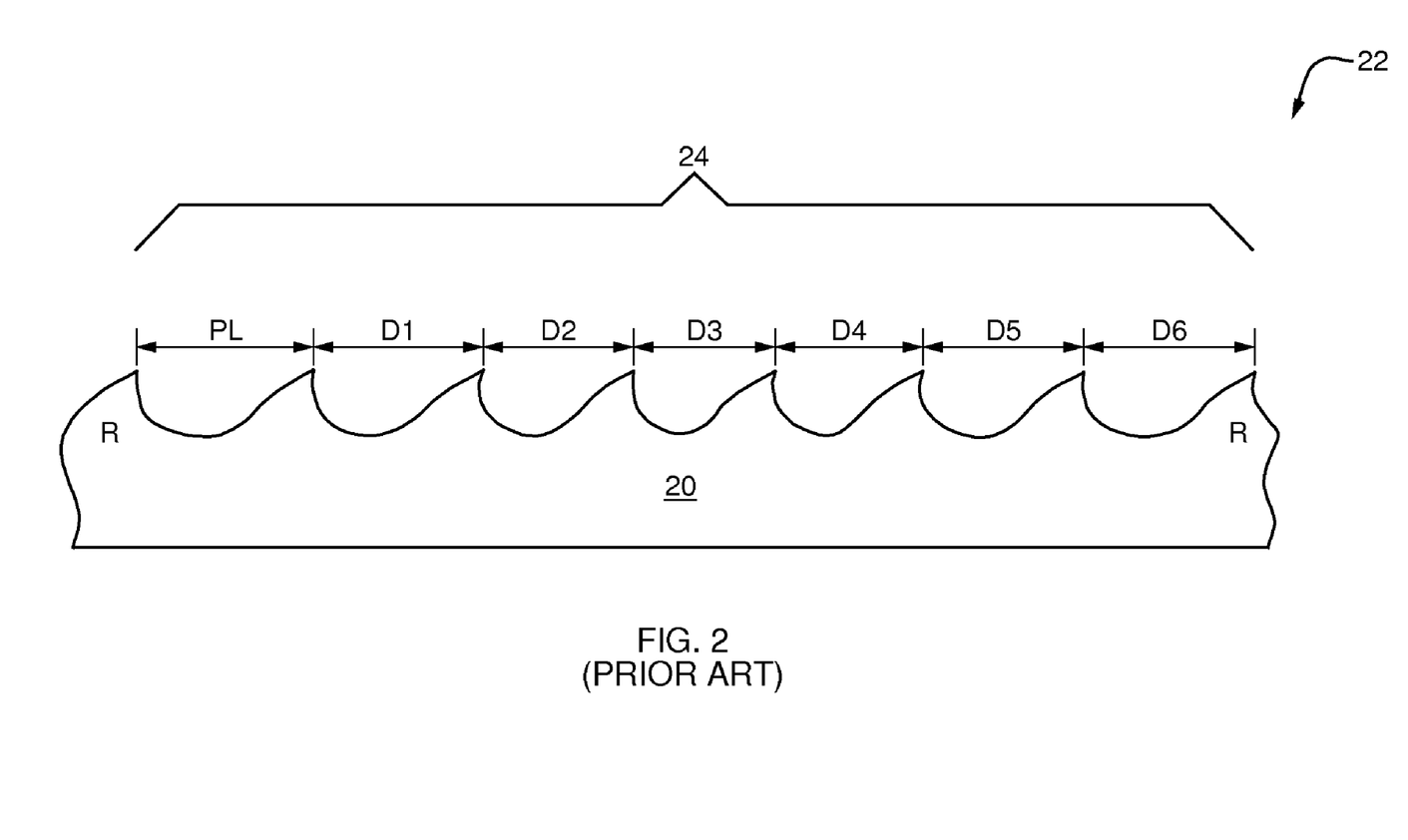
FIG. 2 is schematic side view of a conventional bandsaw blade configuration.
Figure 4C:
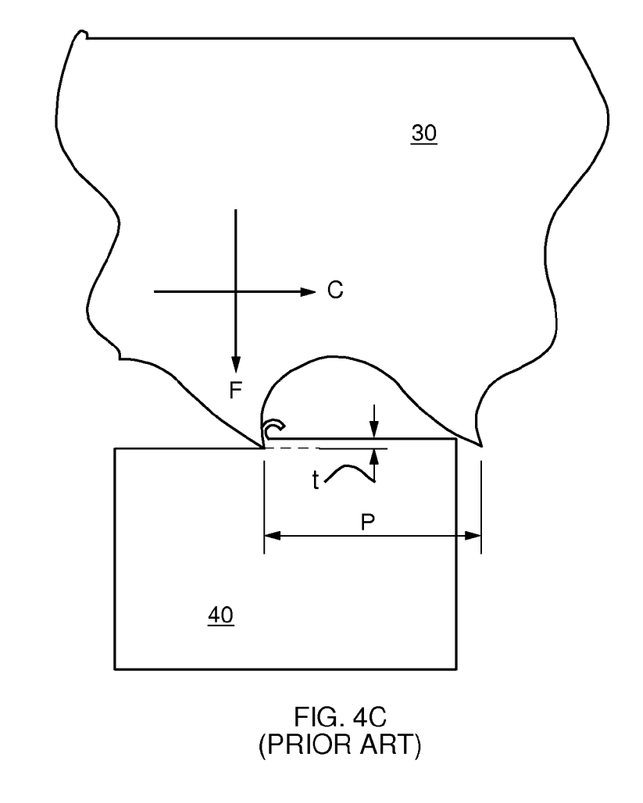
FIG. 4C is a schematic view illustrating an example chip thickness taken by the bandsaw blade of FIGS. 4A and 4B.

FIG. 4C illustrates the removal of material by a bandsaw blade 30 during a cutting operation. The thickness of a layer removed from a work piece 40 by a tooth point during cutting is termed chip thickness. Chip thickness t may be calculated by dividing the feed rate F, defined as the progression of the blade 30 through the work piece 40 in inches per minute, by the speed C of the bandsaw blade 30 in inches per minute. The result is then multiplied by the spacing between adjacent tooth points P in inches. The resulting formula is $t=P*(F/C)$ where the chip thickness t is expressed in inches. Because the raker tooth R has the greatest spacing between its tooth point and the point of the adjacent tooth (e.g., the pitch PL as shown in FIG. 2 and FIG. 3) in the variable pitch pattern, the raker tooth R takes the greatest chip thickness t and provides improved guiding and clearing performance. Subsequent bent, or set, teeth 33, 34 take a chip thickness t that is generally smaller than the chip thickness t taken by the raker tooth R due to the smaller pitch (i.e. smaller tooth point spacing) between adjacent bent teeth 33, 34.

SUMMARY

Conventional bandsaw blade designs, however, suffer from a variety of deficiencies.

As indicated above, in a variable pitch pattern bandsaw blade 30, the raker tooth R has the greatest spacing between its tooth point and the point of the preceding, adjacent tooth. As such, the raker tooth R takes a generally larger chip thickness t from a work piece 40, compared to the set teeth 33, 34 of the blade 30. One consequence of the increased chip thickness t taken by the raker tooth R is an increase in load, and subsequent heat and wear, imposed on the raker tooth point. This increased tooth point loading causes the raker tooth R in a variable pitch tooth pattern to wear out more quickly than other teeth 33, 34 in the pattern. As the raker tooth R wears, such wearing decreases the ability of the raker tooth R to stabilize the cutting action of the bandsaw blade which results in the bandsaw blade deviating (e.g., walking) from an intended cut plane during operation. The final cut may, therefore, no longer remain straight or flat as desired.

One consequence of the variable chip thicknesses t taken by the raker teeth R as compared to the bent teeth 33, 34 on a variable pitch blade is a reduced surface finish on the sawn part. As a tooth travels through the work piece 40, the tooth creates a mark across the sawn surface where the mark is proportional to the chip thickness. If all teeth in a pattern have the same spacing, they take the same chip thickness. Therefore, the differences between the marks or striations formed in the work piece are small and the surface finish of the work piece is considered to be good. Conversely, if the difference in tooth point spacing becomes large, then the resulting chip thicknesses are large and the difference between the marks, or striations, becomes large. When the raker tooth takes the largest chip thickness in a variable tooth pattern, the teeth following the raker tooth can create the most significant marks on the sawn surface of the part. As a result, the surface finish of the work piece can be considered to be poor. Thus, a rough surface finish on the sawn surface of the material being cut is attributable, at least in part, to variations in chip thickness caused by variations in the spacing of the tooth points in a variable pitch pattern. The selection of the tooth point spacing in a variable pitch blade is often done to provide balance between the noise reducing qualities of the variable pitch and the surface finish generated by the band. Typically, the differences or variations in pitch among teeth in conventional saw blades are in the range of between 25% and 35%.

Also as indicated above, the raker tooth R is often provided with the largest tooth spacing PL in the recurring pattern 35 to make it easier for manufacturing to identify which tooth to reference when performing the setting. However, it can be difficult for a manufacturer to visually identify a particular tooth spacing among a group of teeth as being the largest. If, based upon an erroneous identification of the largest tooth spacing in a group of teeth, the manufacturer selects the wrong tooth as the reference tooth (e.g., the raker tooth) then during the setting process, a manufacturer can inadvertently set or bend the incorrect group of teeth (i.e., including the actual raker tooth R). As a result, the overall tooth spacing and set (e.g., bending) of the sawblade teeth will be incorrect. This, in turn, can result in a blade having significantly shortened service life.

Accordingly, there is continued development in the art to improve the operation of bandsaw blades so that the blades have lower levels of noise and vibration during cutting while providing a sawn surface of desired smoothness and flatness and while improving the life of the blade itself.

Embodiments of the invention are directed to a saw blade, such as a bandsaw blade, having a toothform pattern that includes a raker tooth and set teeth. The bandsaw blade teeth are configured such that a spacing or gullet from a tooth point of the raker tooth to a tooth point of an immediately preceding set tooth is the smallest tooth spacing in the saw blade toothform pattern. With the use of a smaller spacing, the raker tooth removes the smallest chip thickness from a work piece relative to the chip thicknesses removed by the set teeth. This reduces the amount of load, and the subsequent heat and wear, imposed on the raker tooth point. In one arrangement, in order to balance the forces on either side of the blade during operation, the saw blade is configured such that an accumulated pitch of the tooth points set to a first side of the blade are substantially equal to the accumulated pitch of the tooth points set to a second opposing side of the blade. In this configuration, the volume of material removed by teeth set to the first side is equal to the volume of material removed by teeth set to the second side. Such a configuration provides a substantially even distribution of work among all of the teeth in the toothform pattern, resulting in subsequently longer blade life.

In one embodiment, a saw blade includes a saw blade body and a group of teeth disposed on the saw blade body. The group of teeth includes a non-set tooth and a plurality of set teeth disposed in a respective set direction relative to a midplane of the saw blade body. At least two teeth of the plurality of set teeth are disposed in opposing set directions relative to the midplane of the saw blade body. Each tooth of the group of teeth is disposed on the saw blade body at a relative pitch, the pitch defined as a distance between a tooth point of a respective tooth of the group of teeth and a tooth point of a preceding tooth of the group of teeth, the preceding tooth being disposed proximate to a front end portion of the respective tooth. The pitch between the non-set tooth and a preceding set tooth is less than the pitch between each set tooth of the plurality of set teeth and a respective preceding tooth.

In one embodiment, a saw blade includes a saw blade body and a group of teeth disposed on the saw blade body. The group of teeth includes a non-set or raker tooth and an even number of set teeth. The even number of set teeth have a first number of set teeth disposed in a first set direction relative to a midplane of the saw blade body and a second number of set teeth disposed in a second set direction relative to the midplane of the saw blade body where the second set direction opposes the first direction. A sum of the distances between the tooth points of adjacent teeth of the first number of set teeth are substantially equal to a sum of the distances between the tooth points of adjacent teeth of the second number of set teeth.

In one embodiment, a saw blade includes a saw blade body and a first group of teeth and a second group of teeth disposed on the saw blade body. The group of teeth includes a first group of teeth and a second group of teeth. The first group of teeth includes a non-set tooth and an odd number of set teeth and the second group of teeth includes a non-set tooth and an odd number of set teeth. The set teeth of the first group of teeth and the second group of teeth include a first number of set teeth disposed in a first set direction relative to the midplane of the saw blade body and a second number of set teeth disposed in a second set direction relative to the midplane of the saw blade body, the second set direction opposing the first direction. A sum of the distances between the tooth points of adjacent teeth of the first number of set teeth is substantially equal to a sum of the distances between the tooth points of adjacent teeth of the second number of set teeth.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the invention are directed to a saw blade, such as a bandsaw blade, having a toothform pattern that includes a raker tooth and set teeth. The bandsaw blade teeth are configured such that a spacing or gullet from a tooth point of the raker tooth to a tooth point of an immediately preceding set tooth is the smallest tooth spacing in the saw blade toothform pattern. With the use of a smaller spacing, the raker tooth removes the smallest chip thickness from a work piece relative to the chip thicknesses removed by the set teeth. This reduces the amount of load, and the subsequent heat and wear, imposed on the raker tooth point. In one arrangement, in order to balance the forces on either side of the blade during operation, the saw blade is configured such that an accumulated pitch of the tooth points set to a first side of the blade are substantially equal to the accumulated pitch of the tooth points set to a second opposing side of the blade. In this configuration, the volume of material removed by teeth set to the first side is equal to the volume of material removed by teeth set to the second side. Such a configuration provides a substantially even distribution of work among all of the teeth in the toothform pattern.

Figure 5A:
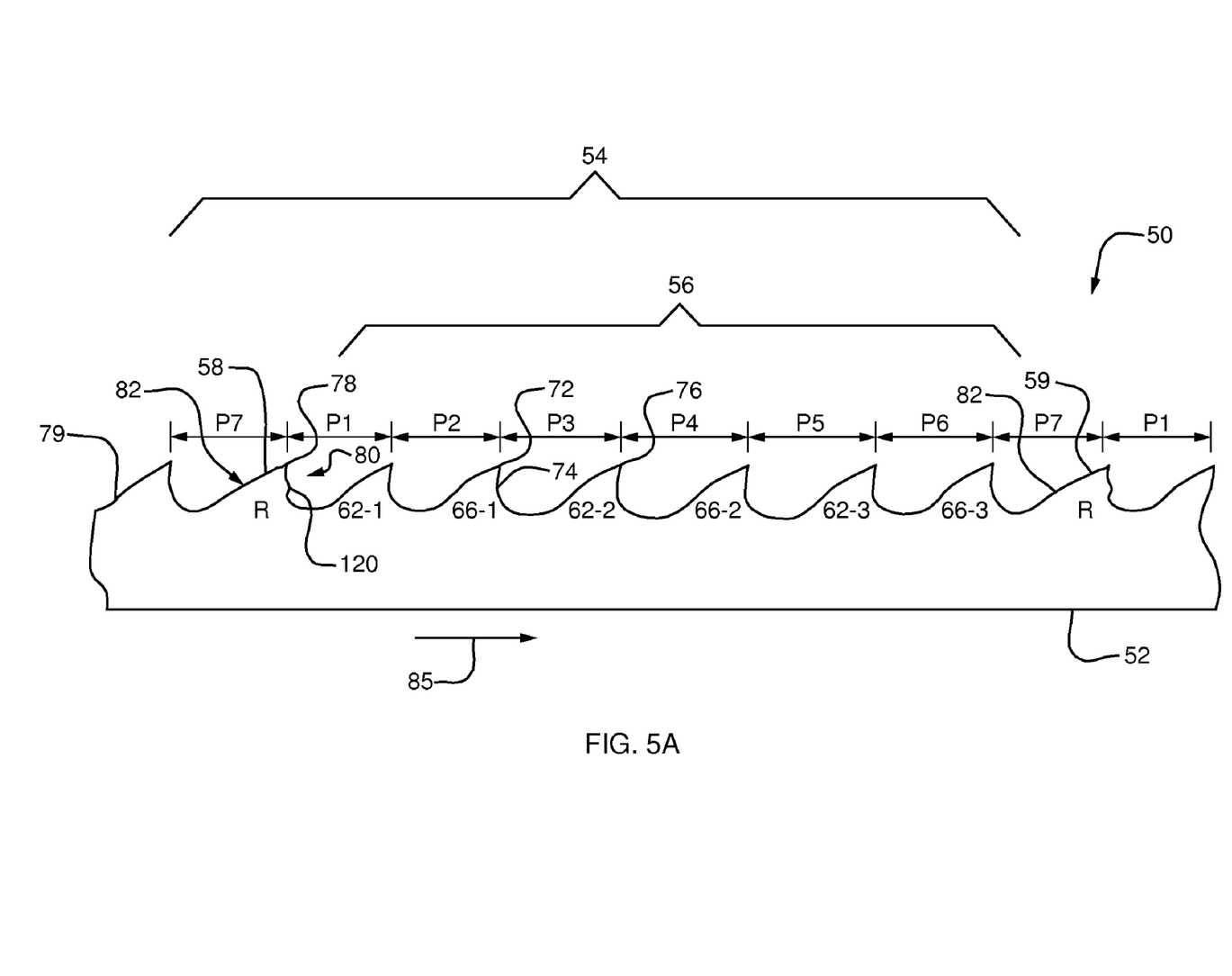
FIG. 5A is a schematic side view of a saw blade, according to one embodiment of the invention.
Figure 5B:
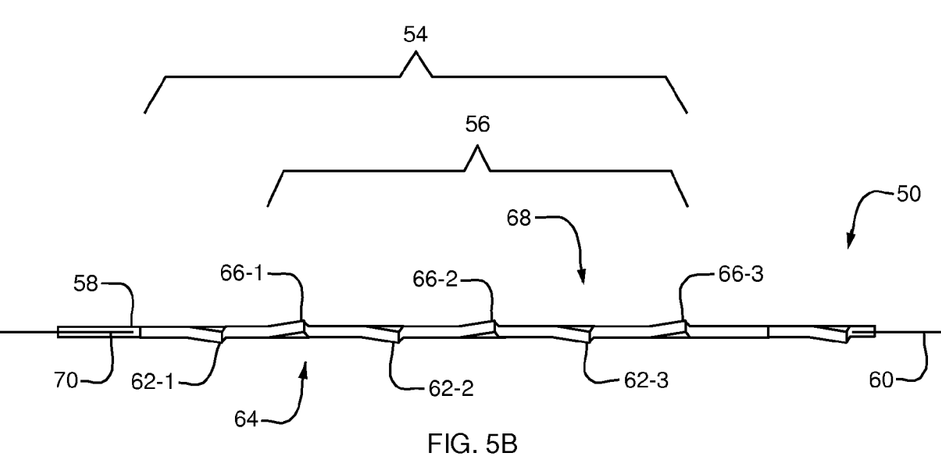
FIG. 5B is a top plan view of the saw blade of FIG. 5A.
Figure 5C:
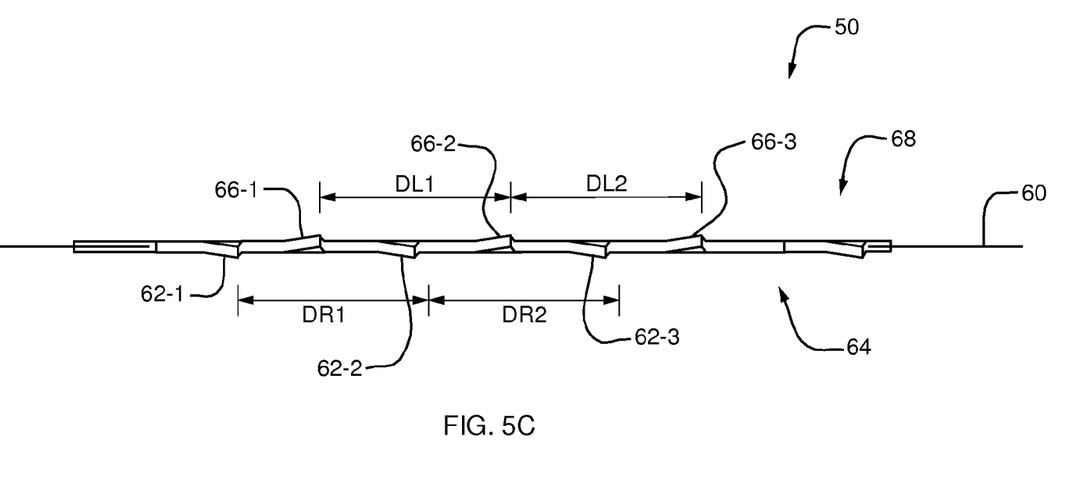
FIG. 5C is a schematic side view of the saw blade of FIG. 5A illustrating the accumulated pitch of the set teeth positioned on either side of the midplane of the saw blade.

FIGS. 5A through 5C illustrate an embodiment of a saw blade 50, such as a bandsaw blade, having a saw blade body or band 52 and a group of teeth 54 disposed on the saw blade body 52 in a toothform pattern. As illustrated, the group of teeth 54 includes a plurality of set teeth 56 and a non-set tooth 58, referred to as a raker tooth herein. The set teeth 56 are disposed on the saw blade body 52 in a respective set direction relative to a midplane 60 of the saw blade body 52. For example, a first number of teeth 62-1, 62-2, 62-3 are set or bent toward a first side 64 of the saw blade body 52 relative to the midplane 60 and a second number of teeth 66-1, 66-2, 66-3 are set or bent toward a second side 68 of the saw blade body 52 relative to the midplane 60. The first and second numbers of teeth 62, 66, therefore define opposing angles relative to the midplane 60 of the saw blade body 52. The raker tooth 58, by contrast, has a long axis 70 that is substantially collinear with the midplane 60 of the saw blade body 52.

Each tooth of the group of teeth 54, i.e., the raker tooth 58 and the set teeth 56, is disposed on the saw blade body 52 at a relative tooth spacing or pitch P. For each tooth of the group of teeth 54, the pitch P is defined as a distance between a tooth point of a respective tooth and a tooth point of a preceding tooth where the preceding tooth is disposed proximate to a front end portion of the respective tooth. For example, with reference to set tooth 66-1 of FIG. 5A, the set tooth 62-2 is disposed proximate to a front end portion 74 of the set tooth 66-1. The pitch P3 is therefore defined as the distance between a tooth point 72 of the set tooth 66-1 and a tooth point 76 of the set tooth 62-2.

In one arrangement, the group of teeth 54 is disposed on the saw blade body 52 in a variable pitch pattern such that the relative tooth spaces P are unequal. In such an arrangement, each of the pitches P1-P7 in the group of teeth 54 is distinct from each other (e.g., P1≠P2≠P3≠P4≠P5≠P6≠P7). In the case where a pattern of unequal pitches P1-P7 are repeated along an entire length of the saw blade body 52 for multiple groups of teeth 54, the variable pitches P help to limit the vibration, and hence the noise, created by the saw blade 50 during operation.

While the variable tooth spacings P1-P7 among adjacent teeth of the group of teeth 54 can be configured in a variety of ways, in one embodiment, the variable tooth spacings P1-P7 are formed such that the tooth spacing P1 between the raker tooth 58 and the set tooth 62-1 is smaller than the tooth spacings P2-P7 formed between adjacent set teeth 62, 66 in the group of teeth 54. With this configuration, the raker tooth 58 is configured to remove the smallest chip thickness from a work piece, relative to the set teeth 62, 66. As a result, the relatively small pitch P1 between the raker tooth 58 and the preceding set tooth 62-1 reduces the amount of load, and the subsequent heat and wear, imposed on the raker tooth point 78 and provides substantially even wear of the raker tooth 58 and set teeth 62, 66 during operation.

In one arrangement, the tooth spacings or pitch of the set teeth 62, 66 are arranged such that the relatively smaller tooth spacings in the variable pitch pattern are arranged around the raker tooth 58, i.e., immediately adjacent a front portion 80 and a back portion 82 of the raker tooth 58. For example, with reference to FIG. 5A, assume the group of teeth 54 is arranged with following pitches: P1=0.366 inches, P2=0.396 inches, P3=0.410 inches, P4=0.438 inches, P5=0.444 inches, P6=0.400 inches, and P7=0.380 inches. In this example, the smallest tooth spacing P1 of the group of teeth 54 occurs between the raker tooth 58 and the set tooth 62-1 disposed in proximity to the front portion 80 of the raker tooth 58 (i.e., along a cutting direction 85 of the saw blade 50). Also, the second smallest tooth spacing of the group of teeth 54 occurs at P7 between a set tooth 79 of a second group of teeth (not shown) and the raker tooth 58. Furthermore, with reference to the set tooth 62-1, the tooth spacings P2-P4 then become progressively larger along the cutting direction 85, with the largest tooth spacing occurring in the middle of the group of teeth 54, for example at the tooth spacing P4 between the set tooth 62-2 and the set tooth 66-2. From the set tooth 66-2, the tooth spacings P5-P7 then become progressively smaller for the set teeth 66-2, 62-3, 66-3 disposed in proximity to a second raker tooth 59 of the saw blade 50. With the smallest relative tooth spacings being arranged in proximity to the raker tooth 58, the raker tooth 58 and adjacent set teeth 62, 66 are configured to remove the smallest chip thicknesses from a work piece. Such an arrangement reduces the amount of load, and the subsequent heat and wear, imposed on the raker tooth point 78 and provides substantially even wear of the raker tooth 58 and set teeth 62, 66 during operation.

As indicated above, the group of teeth 54 is disposed on the saw blade body 52 in a variable pitch pattern such that the relative pitches P between the teeth are unequal. In one arrangement, the pitch variation among the teeth of the group 54 is minimized to reduce variations in chip thicknesses removed from a work piece during use. For example, the variation in pitch in a group of teeth 54 is defined as the difference between the largest pitch P in the group of teeth 54, such as P5, and the smallest tooth spacing in the group of teeth 54, such as P1, where the difference is relative to the largest pitch P in the group of teeth 54, as provided in the relationship:

$$P_{VARIATION} = (P_{MAX} - P_{MIN})/P_{MAX}.$$

In one arrangement, the variation in pitch in the group of teeth 54 is in the range of about 10% to about 25%. In another arrangement, the variation in pitch in the group of teeth 54 is less than 20%. With minimal pitch variation among the variable pitch teeth of the group of teeth 54, in use, the saw blade 50 minimizes the variation in the chip thicknesses removed from a work piece and results in a closer chip thickness between chips cut by the raker teeth 58 and those cut by the set teeth 62, 66. This reduces the differences between marks or striations formed in the work piece during operation of the saw blade 50 and provides a relatively smooth or acceptable surface finish of the cut work piece.

As shown in FIGS. 5A through 5C, the saw blade 50 is configured with an odd number of teeth in the group of teeth 54 (i.e., the raker tooth 58, three set teeth 62 bent toward the first side 64 of the midplane 60, and three set teeth 66 bent toward the second side 68 of the midplane 60). As shown, the set teeth 62, 66 of the group of teeth 54 are bent to either side 64, 68 of the midplane 60 in an alternating manner.

In one arrangement, the accumulated pitch of the tooth points set to the first side 64 of the saw blade 50 is substantially equal to the accumulated pitch of the tooth points set to the second side 68 of the saw blade 50. For example, with reference to FIG. 5C, for the set teeth 62 bent toward the first side 64 of the midplane 60, the spacing between the tooth point of the first set tooth 62-1 and the tooth point of the second set tooth 62-2 defines a distance DR1 and the spacing between the tooth point of the second set tooth 62-2 and the tooth point of the third set tooth 62-3 defines a distance DR2. For the set teeth 66 bent toward the second side 68 of the midplane 60, the spacing between the tooth point of the first set tooth 66-1 and the tooth point of the second set tooth 66-2 defines a distance DL1 and the spacing between the tooth point of the second set tooth 66-2 and the tooth point of the third set tooth 66-3 defines a distance DL2. In this configuration, the sum of DR1 and DR2 is substantially equal to the sum of DL1 and DL2. Therefore, during operation, a volume of material removed from a work piece by the set teeth 62 bent to the first side 64 is substantially equal to a volume of material removed by the set teeth 66 bent to the second side 68. As a result, the saw blade 50 provides a relatively smooth or acceptable surface finish of the cut work piece. Additionally, this configuration of the set teeth 62, 66 balances forces generated by the set teeth 62, 66 on either side 64, 68 of the saw blade 50 during a cutting operation to minimize drift of the saw blade 50 away from an intended cut plane in a work piece and to provide a relatively long blade life.

Figure 6A:
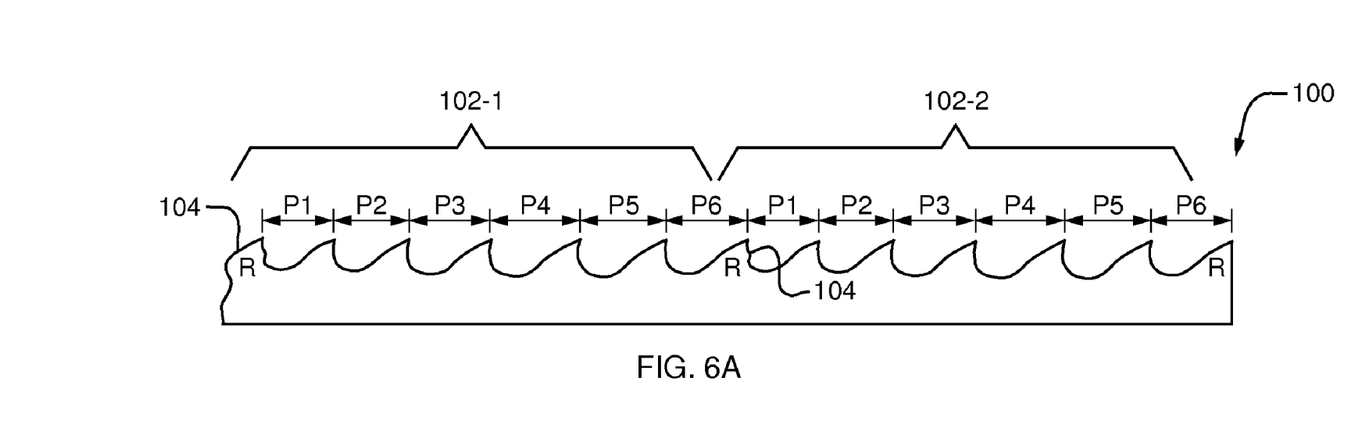
FIG. 6A is a schematic side view of a saw blade, according to one embodiment of the invention.
Figure 6B:
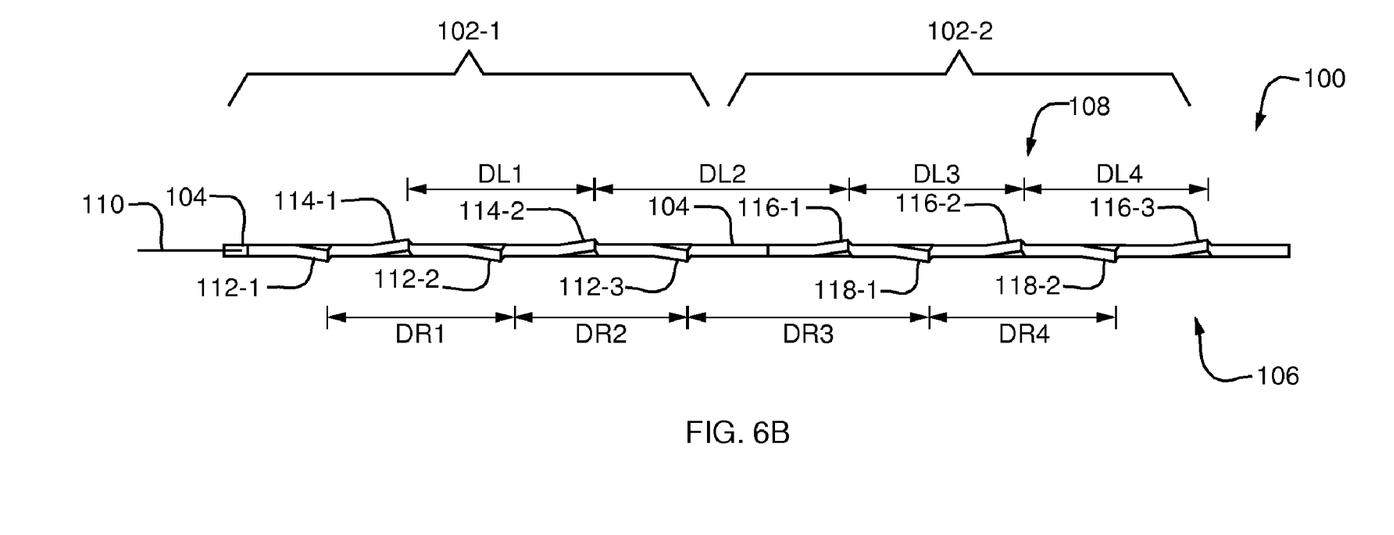
FIG. 6B is a top plan view of the saw blade of FIG. 6A.

FIGS. 5A through 5C illustrate a saw blade 50 configured with an odd number of teeth in the group of teeth 54. In one arrangement, as shown in FIGS. 6A and 6B, a saw blade 100 is configured with a toothform pattern having an even number of teeth in a group 102. By way of example, the saw blade 100 is shown as having two groups of teeth 102-1, 102-2 with the teeth are arranged in a variable pitch pattern such that the smaller tooth spacings (P1 and P6) are arranged around the raker teeth 104 (i.e., immediately adjacent the front portion and back portion of each raker tooth) and the largest tooth spacings (P2-P5) occur between adjacent set teeth.

Each group of teeth 102-1, 102-2 includes set teeth configured such that, for both groups of teeth 102-1, 102-2, the set teeth are bent to either a first side 106 or a second side 108 of the saw blade 100, relative to a midplane 110, in an alternating manner. For example, the first group of teeth 102-1 includes three set teeth 112-1, 112-2, 112-3 bent toward the first side 106 of the saw blade 100 and two set teeth 114-1, 114-2 bent toward the second side 108 of the saw blade 100. The second group of teeth 102-1 includes two set teeth 118-1, 118-2, bent toward the first side 106 of the saw blade 100 and three set teeth 116-1, 116-2, 116-3 bent toward the second side 108 of the saw blade 100.

In this configuration, for both groups of teeth 102-1, 102-2, the accumulated pitch of the tooth points of the set teeth 112, 118 set to the first side 106 of the saw blade 100 is substantially equal to the accumulated pitch of the tooth points of the set teeth 114, 116 set to the second side 108 of the saw blade 100. For example, the sum of the distances DR1, DR2, DR3, and DR4 between adjacent set teeth 112, 118 set to the first side 106 of the saw blade 100 is substantially equal to the sum of the distances DL1, DL2, DL3, and DL4 between adjacent set teeth 114, 116 set to the second side 108 of the saw blade 100. Therefore, for both groups of teeth 102-1, 102-2, for every tooth of a given tooth spacing that is set one direction there is another tooth having substantially the same tooth spacing set in the opposing direction. As a result, in this configuration, during operation, a volume of material removed from a work piece by the set teeth 112, 118 bent to the first side 106 is substantially equal to a volume of material removed by the set teeth 114, 116 bent to the second side 108. As a result, the saw blade 100 provides a balance in the volume of material cut on one side 106 of the saw blade 100 versus the other side 108 which minimizes drift of the saw blade 50 away from an intended cut plane in a work piece during a cutting operation.

In one arrangement, with reference to FIG. 5A, the raker tooth 58 includes a raker tooth identifier 120 disposed on the raker tooth 58. Because the raker tooth identifier 120 is disposed on the raker tooth 58, the raker tooth identifier 120 allows a manufacturer to easily distinguish each raker tooth 58 of a saw blade from the other teeth of the saw blade. As a result, the manufacturer can readily identify and select each raker tooth 58 of a saw blade as a reference tooth and can set or bend all other teeth (i.e., non-raker teeth) of the saw blade relative to the identified, reference raker tooth 58.

The raker tooth identifier 120 can be configured in a variety of ways. For example, as shown in FIG. 5A, the raker tooth identifier 120 is configured as a protrusion disposed on a front portion 80 of the raker tooth 58. In another example, the raker tooth identifier 120 can be configured as a protrusion disposed on a back portion 82 of the raker tooth 58.

While various embodiments of the invention have been particularly shown and described, it will be understood by those skilled in the art that various changes in form and details may be made therein without departing from the spirit and scope of the invention as defined by the appended claims.

For example, as indicated above, the toothform patterns form part of a saw blade, such as a bandsaw blade. Such description is by way of example only. The toothform patterns provided above can also be formed on other types of saw blades, such as circular saw blades for example.

Also, as described above with reference to FIG. 5A, the smallest tooth spacing P1 of the group of teeth 54 occurs between the raker tooth 58 and the set tooth 62-1 disposed in proximity to the front portion 80 and the second smallest tooth spacing of the group of teeth 54 occurs at P7 between a set tooth 79 of a second group of teeth (not shown) and the raker tooth 58. Such description is by way of example only. In one arrangement, the smallest tooth spacings of the group of teeth 54 occurs at P1 between the raker tooth 58 and the set tooth 62-1 disposed in proximity to the front portion 80 and at P7 between a set tooth 79 of a second group of teeth (not shown) and the raker tooth 58 where the spacings P1 and P7 are substantially equal.

As shown in FIG. 5A and described above, the raker tooth identifier 120 is configured as a protrusion disposed on a front portion 80 or on a back portion 82 of the raker tooth 58. Such description is by way of example only. In one arrangement, the raker tooth identifier 120 is configured as a marking, such as an ink marking, disposed on a front portion 80 or on a back portion 82 of the raker tooth 58.

Figure 7:
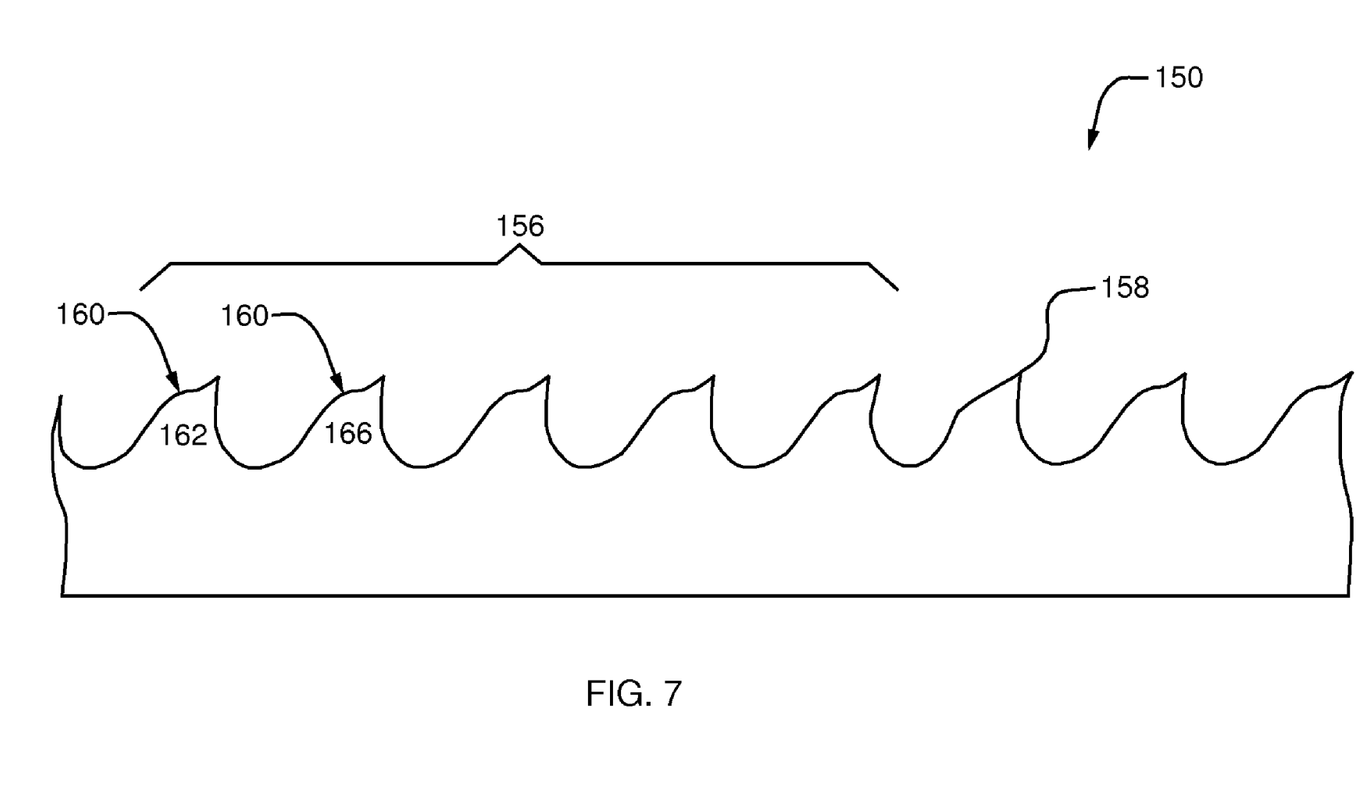
FIG. 7 is a schematic side view of a saw blade having set tooth identifiers disposed on the set teeth of the saw blade, according to one embodiment.

Also as indicated with respect to FIG. 5A, each raker tooth 58 of a saw blade 50 includes a raker tooth identifier 120 to visually distinguish the raker tooth 58 from the other teeth (i.e. set teeth) of the saw blade 50. Such description is by way of example only. In one arrangement, as shown in FIG. 7, each non-raker tooth (i.e., set tooth) 162, 166 of a group of set teeth 156 of a saw blade 150 includes a set tooth identifier 160 configured to distinguish each set tooth 156 from the raker tooth 158. For example, each non-raker tooth 162, 166 can include a set tooth identifier 160 disposed on a back portion of the tooth 162, 166 which allows a user to visually distinguish the raker tooth 158.

Figure 8A:
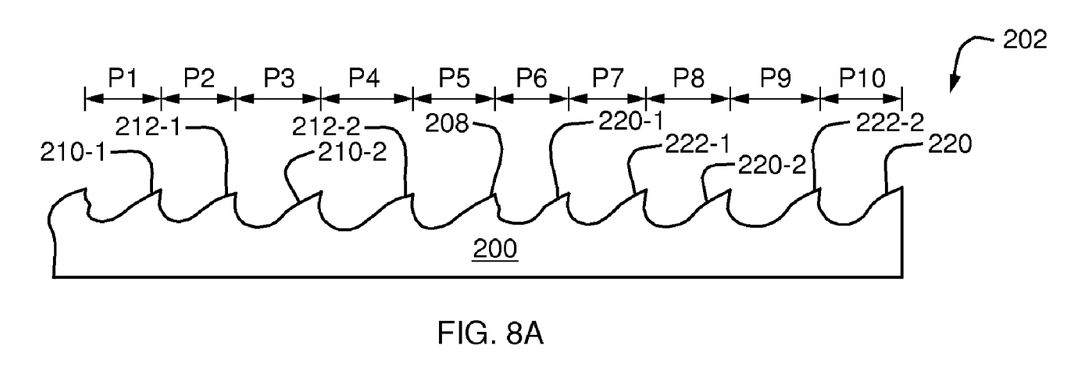
FIG. 8A is a schematic side view of a saw blade, according to one embodiment of the invention.
Figure 8B:
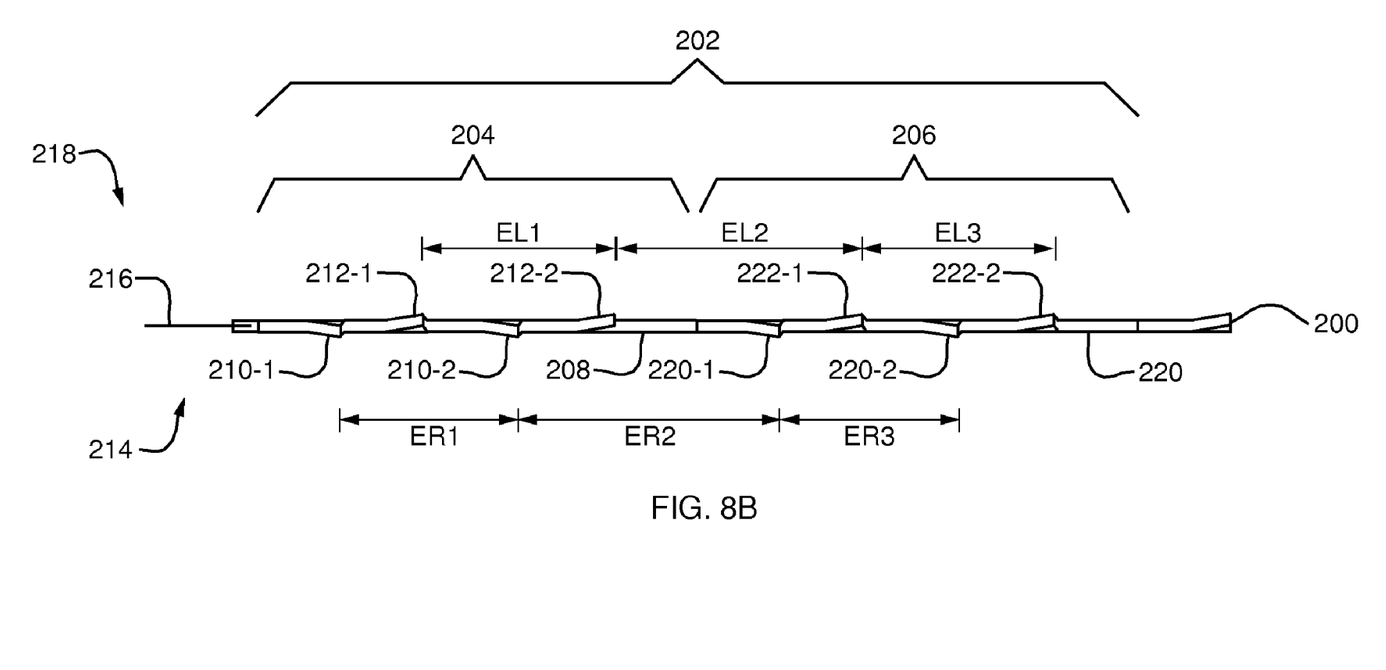
FIG. 8B is a top plan view of the saw blade of FIG. 8A.

As described above, FIGS. 5A through 5C illustrate a saw blade 50 configured with an odd number of teeth in the group of teeth 54, i.e., the raker tooth 58 and an even number of set teeth 62, 66 (three set teeth 62 bent toward the first side 64 of the midplane 60 and three set teeth 66 bent toward the second side 68 of the midplane 60). Also as described, the group of teeth 54 can be disposed on the saw blade body 52 in a variable pitch pattern such that each of the pitches P1-P7 in the group of teeth 54 is distinct from each other (e.g., P1≠P2≠P3≠P4≠P5 P6≠P7). Such description is by way of example only. In one arrangement, as illustrated in FIGS. 8A and 8B, a saw blade 200 is configured with a group of teeth 202 having a first subgroup of teeth 204 and a second subgroup of teeth 206. The first subgroup of teeth 204 includes a raker tooth 208 and an even number of set teeth 210, 212 where two set teeth 210-1, 210-2 are bent toward a first side 214 of a midplane 216 of the saw blade 200 and two set teeth 212-1, 212-2 are bent toward a second side 218 of the midplane 216. The second subgroup of teeth 206 also includes a raker tooth 220 and an even number of set teeth 220, 222 where two set teeth 220-1, 220-2 are bent toward the first side 214 of the midplane 216 of the saw blade 200 and two set teeth 222-1, 222-2 are bent toward a second side 218 of the midplane 216. With such an arrangement, the group of teeth 202 includes an even number of teeth, in total, and includes an even number of set teeth 210, 212, 220, 222 disposed in a recurring pattern along a length of the saw blade 200.

In one arrangement, with reference to FIGS. 8A and 8B, the set teeth 210, 212, 220, 222 of each subgroup of teeth 204, 206 are configured in a matched pair spacing arrangement. For example, with reference to the first subgroup of teeth 204, the first set tooth 210-1 is disposed at a pitch P2 relative to the second set tooth 212-1, the second set tooth 212-1 is disposed at a pitch P3 relative to the third set tooth 210-2, the third set tooth 210-2 is disposed at a pitch P4 relative to the fourth set tooth 212-2, and the fourth set tooth 212-2 is disposed at a pitch P5 relative to the raker tooth 208. In the matched pair spacing arrangement, the set teeth 210, 212 are arranged such that P2≠P3, P3≠P4, P4≠P5, P2=P4, and P3=P5. As such, while adjacently positioned set teeth 210, 212 are disposed at different pitch spacings relative to each other, adjacent pairs of teeth (e.g., the first set tooth 210-1 and the second set tooth 212-1 forming a pair of teeth and the third set tooth 210-2 and the fourth set tooth 212-2 forming a pair of teeth) are disposed in a recurring pattern within a subgroup of teeth.

While the teeth within adjacent subgroups of teeth 204, 206 can be configured in a matched pair spacing arrangement as described above, in one arrangement, the matched pair pitch spacings can vary by subgroup. For example, as described above, for the first subgroup of teeth 204, the set teeth 210, 212 are arranged such that P2≠P3, P3≠P4, P4≠P5, P2=P4, and P3=P5. Furthermore, for the second subgroup of teeth 206, the set teeth 220, 222 are arranged such that P7≠P8, P8≠P9, P9≠P10, P7=P9, and P8=P10. In the case where the matched pair pitch spacings vary by subgroup, P2≠P7, P4 ≠P9, P3≠P8, and P5≠P9. As such, a toothform pattern for the group of teeth 202 is repeated along an entire length of the saw blade 200 for multiple groups of teeth 200. As a result, the aforementioned matched pair spacing arrangement help to limit the vibration, and hence the noise, created by the saw blade 200 during operation.

Furthermore, with respect to the saw blade 200 of FIGS. 8A and 8B, in one arrangement, the accumulated pitch of the tooth points set to the first side 214 of the saw blade 200 is substantially equal to the accumulated pitch of the tooth points set to the second side 218 of the saw blade 200. For example, with reference to FIG. 8B, for the set teeth 210, 220 bent toward the first side 214 of the midplane 216, the spacing between the tooth point of the first set tooth 210-1 and the tooth point of the third set tooth 210-2 defines a distance ER1, the spacing between the tooth point of the third set tooth 210-2 and the tooth point of the fifth set tooth 220-1 defines a distance ER2, and the spacing between the tooth point of the fifth set tooth 220-1 and the tooth point of the seventh set tooth 220-2 defines a distance ER3. For the set teeth 210, 220 bent toward the second side 218 of the midplane 60, the spacing between the tooth point of the second set tooth 212-1 and the tooth point of the fourth set tooth 212-2 defines a distance EL1, the spacing between the tooth point of the fourth set tooth 212-2 and the tooth point of the sixth set tooth 222-1 defines a distance EL2, and the spacing between the tooth point of the sixth set tooth 222-1 and the tooth point of the eighth set tooth 222-2 defines a distance EL3. In this configuration, the sum of ER1, ER2, and ER3 is substantially equal to the sum of EL1, EL2, and EL3. Therefore, during operation, a volume of material removed from a work piece by the set teeth 210, 220 bent to the first side 214 is substantially equal to a volume of material removed by the set teeth 212, 222 bent to the second side 218. As a result, in use the saw blade 200 provides a relatively smooth or acceptable surface finish of the cut work piece and minimizes drift of the saw blade 200 away from an intended cut plane in a work piece.

What is claimed is:

1. A saw blade, comprising:
a saw blade body; and
a group of teeth disposed on the saw blade body, the group of teeth having a non-set tooth and a plurality of set teeth, each of the plurality of set teeth disposed in a respective set direction relative to a midplane of the saw blade body, at least two teeth of the plurality of set teeth disposed in opposing set directions relative to the midplane of the saw blade body the plurality of set teeth including a total of no more than six set teeth,
the group of teeth having the non-set tooth and the plurality of set teeth defining a toothform pattern of teeth, the toothform pattern of teeth repeated consecutively as a recurring pattern along an entire length of the saw blade body such that no intervening teeth and no intervening toothform patterns of teeth are disposed between each consecutively recurring toothform pattern of teeth,
each tooth of the group of teeth disposed on the saw blade body at a relative pitch, the pitch defined as a distance between a tooth point of a respective tooth of the group of teeth and a tooth point of a preceding tooth of the group of teeth, the preceding tooth disposed proximate to a front end portion of the respective tooth, the pitch between the non-set tooth and a preceding set tooth of the group of teeth being the smallest pitch of the toothform pattern of teeth, such that the pitch between the non-set tooth and the preceding set tooth is less than the pitch between each set tooth of the plurality of set teeth and a corresponding preceding tooth of the group of teeth;

wherein the plurality of set teeth comprises:

a first set tooth disposed in a first set direction relative to the midplane of the saw blade body and a second set tooth disposed in the first set direction relative to the midplane of the saw blade body, the first set tooth and the second set tooth disposed in the first set direction being disposed on the saw blade body on opposing sides of the non-set tooth such that the first set tooth disposed in the first set direction is proximate to a front end portion of the non-set tooth and such that the second set tooth disposed in the first set direction is proximate to a trailing end portion of the non-set tooth;

a first set tooth disposed in a second set direction relative to the midplane of the saw blade body and a second set tooth disposed in the second set direction relative to the midplane of the saw blade body, the second set direction opposing the first set direction, the first set tooth and the second set tooth disposed in the second set direction being disposed on the saw blade body on opposing sides of the non-set tooth such that the first set tooth disposed in the second set direction is proximate to a front end portion of the non-set tooth and such that the second set tooth disposed in the second set direction is proximate to a trailing end portion of the non-set tooth;

a distance between the tooth point of the first set tooth disposed in the first set direction and the tooth point of the second set tooth disposed in the first set direction being substantially equal to a distance between the tooth point of the first set tooth disposed in the second set direction and the tooth point of the second set tooth disposed in the second set direction.

2. The saw blade of claim 1, wherein the pitch defined between a set tooth of the plurality of set teeth and the non-set tooth disposed proximate to a front end portion of the set tooth of the plurality of set teeth is greater than the pitch between the non-set tooth and the preceding set tooth and is less than the pitch between each remaining set tooth of the plurality of set teeth and a preceding tooth.

3. The saw blade of claim 1, wherein the group of teeth comprises a variation in pitch between a largest pitch of the group of teeth and a smallest pitch of the group of teeth, the variation in pitch being in the range of about 10% to about 25%.

4. The saw blade of claim 1, wherein the group of teeth comprises a variation in pitch between a largest pitch of the group of teeth and a smallest pitch of the group of teeth, the variation in pitch being less than 20%.

5. The saw blade of claim 1, wherein:
the group of teeth comprises the non-set tooth and an even number of set teeth.

6. The saw blade of claim 1, wherein the non-set tooth comprises a non-set tooth identifier disposed on a front end portion of the non-set tooth.

7. The saw blade of claim 1, wherein each set tooth of the plurality of set teeth comprises a set tooth identifier disposed on a set tooth portion of each of the plurality of set teeth, the set tooth identifier configured to distinguish each set tooth of the plurality of set teeth from the non-set tooth.

8. The saw blade of claim 1, wherein the pitch for a selected tooth of the group of teeth is unequal to the pitch of each non-selected tooth of the group of teeth.

9. A saw blade, comprising:
a saw blade body; and
a group of teeth disposed on the saw blade body, the group of teeth having a non-set tooth and an even number of set teeth, the even number of set teeth having a first number of set teeth disposed in a first set direction relative to a midplane of the saw blade body and a second number of set teeth disposed in a second set direction relative to the midplane of the saw blade body, the second set direction opposing the first direction, the even number of set teeth including a total of no more than six set teeth, the group of teeth having the non-set tooth and the even number of set teeth defining a toothform pattern, the toothform pattern repeated consecutively as a recurring pattern along an entire length of the saw blade body such that no intervening teeth and no intervening toothform patterns of teeth are disposed between each consecutively recurring toothform pattern of teeth, a sum of the distances between the tooth points of adjacent teeth of the first number of set teeth being substantially equal to a sum of the distances between the tooth points of adjacent teeth of the second number of set teeth, wherein each tooth of the group of teeth is disposed on the saw blade body at a relative pitch, the pitch defined as a distance between a tooth point of a respective tooth of the group of teeth and a tooth point of a preceding tooth of the group of teeth, the preceding tooth disposed proximate to a front end portion of the respective tooth, the pitch between the non-set tooth and a preceding set tooth of the group of teeth being the smallest pitch of the toothform pattern of teeth, such that the pitch between the non-set tooth and the preceding set tooth is less than the pitch between each set tooth of the plurality of set teeth and a corresponding preceding tooth of the group of teeth, wherein the plurality of set teeth comprises:

a first set tooth disposed in a first set direction relative to the midplane of the saw blade body and a second set tooth disposed in the first set direction relative to the midplane of the saw blade body, the first set tooth and the second set tooth disposed in the first set direction being disposed on the saw blade body on opposing sides of the non-set tooth such that the first set tooth disposed in the first set direction is proximate to a front end portion of the non-set tooth and such that the second set tooth disposed in the first set direction is proximate to a trailing end portion of the non-set tooth;

a first set tooth disposed in a second set direction relative to the midplane of the saw blade body and a second set tooth disposed in the second set direction relative to the midplane of the saw blade body, the second set direction opposing the first set direction, the first set tooth and the second set tooth disposed in the second set direction being disposed on the saw blade body on opposing sides of the non-set tooth such that the first set tooth disposed in the second set direction is proximate to a front end portion of the non-set tooth and such that the second set tooth disposed in the second set direction is proximate to a trailing end portion of the non-set tooth;

a distance between the tooth point of the first set tooth disposed in the first set direction and the tooth point of the second set tooth disposed in the first set direction being substantially equal to a distance between the tooth point of the first set tooth disposed in the second set direction and the tooth point of the second set tooth disposed in the second set direction.

10. The saw blade of claim 9, wherein the pitch defined between a set tooth of the plurality of set teeth and the non-set tooth disposed proximate to a front end portion of the set tooth of the plurality of set teeth is greater than the pitch between the non-set tooth and the preceding set tooth and is less than the pitch between each remaining set tooth of the plurality of set teeth and a preceding tooth.

11. The saw blade of claim 9, wherein the group of teeth comprises a variation in pitch between a largest pitch of the group of teeth and a smallest pitch of the group of teeth, the variation in pitch being in the range of about 10% to about 25%.

12. The saw blade of claim 9, wherein the non-set tooth comprises a non-set tooth identifier disposed on the non-set tooth.

* * * * *